(12) United States Patent
Yamamoto et al.

(10) Patent No.: US 11,333,191 B2
(45) Date of Patent: May 17, 2022

(54) CRANKSHAFT

(71) Applicant: SUBARU CORPORATION, Tokyo (JP)

(72) Inventors: Masatoshi Yamamoto, Tokyo (JP); Atsushi Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 260 days.

(21) Appl. No.: 16/717,611

(22) Filed: Dec. 17, 2019

(65) Prior Publication Data

US 2020/0309187 A1    Oct. 1, 2020

(30) Foreign Application Priority Data

Mar. 27, 2019  (JP) .............................. JP2019-060358

(51) Int. Cl.
*F16C 3/04*  (2006.01)
*F16C 3/14*  (2006.01)

(52) U.S. Cl.
CPC ...................................... *F16C 3/14* (2013.01)

(58) Field of Classification Search
CPC ................. F16C 3/06; F16C 3/14; F16C 3/16
See application file for complete search history.

(56) References Cited

U.S. PATENT DOCUMENTS

| | | | | |
|---|---|---|---|---|
| 5,152,373 A * | 10/1992 | Callies | ..................... | F01M 1/06 123/196 R |
| 6,446,497 B1 * | 9/2002 | Glaser | ................... | G01H 1/003 73/114.57 |
| 8,307,804 B2 * | 11/2012 | Ohta | ........................ | F01M 1/06 123/196 R |
| 8,479,703 B2 * | 7/2013 | Zapp | ....................... | F01M 1/06 123/196 R |
| 8,667,947 B2 * | 3/2014 | Ota | .......................... | F01M 1/06 123/196 R |
| 9,279,444 B2 * | 3/2016 | Beaurepaire | .............. | F16C 3/14 |
| 2008/0025658 A1 * | 1/2008 | Hochmayr | ................ | F16C 9/02 384/457 |

(Continued)

FOREIGN PATENT DOCUMENTS

| | | | | |
|---|---|---|---|---|
| DE | 102008059621 A1 * | 6/2010 | ................ | F16C 3/14 |
| DE | 102010023297 A1 * | 12/2011 | ................ | F16C 3/14 |

(Continued)

OTHER PUBLICATIONS

Machine translation of FR 1310621 A obtained on Feb. 28, 2020.*
Machine translation of DE 102010023297 A1 obtained on Feb. 28, 2020.*

*Primary Examiner* — Adam D Rogers
(74) *Attorney, Agent, or Firm* — McGinn IP Law Group, PLLC

(57) ABSTRACT

A crankshaft includes a first oil hole, a second oil hole, and a through hole. The second oil hole extends in a direction in which the second oil hole intersects the first oil hole. A first extension is an imaginary line extending from an inner wall surface of the first oil hole on a second oil hole side. A second extension is an imaginary line extending from an inner wall surface of the second oil hole on a first oil hole side. The through hole passes through an intersection between the first extension and the second extension. At least one end of the through hole opens on an outer peripheral surface.

7 Claims, 3 Drawing Sheets

(56) References Cited

U.S. PATENT DOCUMENTS

2017/0261029 A1\* 9/2017 De Rooij .............. F16C 33/105
2017/0268392 A1\* 9/2017 Song ........................ F16C 3/14

FOREIGN PATENT DOCUMENTS

| DE | 102012222353 A1 \* | 6/2013 | ................ F16C 3/14 |
| DE | 102013113430 A1 \* | 6/2015 | ................ F16C 9/04 |
| DE | 102014118702 A1 \* | 6/2016 | ................ F16C 3/14 |
| DE | 102015110742 A1 \* | 1/2017 | ................ F16C 3/14 |
| FR | 1310621 A \* | 11/1962 | ................ F16C 3/14 |
| JP | H0550011 U \* | 7/1993 | ................ F16C 9/00 |
| JP | 2011-208741 A | 10/2011 | |
| WO | WO-2017207617 A1 \* | 12/2017 | ................ F16C 3/14 |

\* cited by examiner

CRANKSHAFT

CROSS-REFERENCE TO RELATED APPLICATIONS

The present application claims priority from Japanese Patent Application No. 2019-060358 filed on Mar. 27, 2019, the entire contents of which are hereby incorporated by reference.

BACKGROUND

The present disclosure relates to a crankshaft.

Crankshafts have oil holes through which lubricating oil flows. For example, Japanese Unexamined Patent Application Publication (JP-A) No. 2011-208741 discloses a structure in which two crank pin oil supply passages are inclined so as to each intersect with an axial line of a corresponding crank pin and intersect with each other.

SUMMARY

An aspect of the disclosure provides a crankshaft. The crankshaft includes a first oil hole, a second oil hole, and a through hole. The second oil hole extends in a direction in which the second oil hole intersects the first oil hole. A first extension is an imaginary line extending from an inner wall surface of the first oil hole on a second oil hole side. A second extension is an imaginary line extending from an inner wall surface of the second oil hole on a first oil hole side. The through hole passes through an intersection between the first extension and the second extension. At least one end of the through hole opens on an outer peripheral surface.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
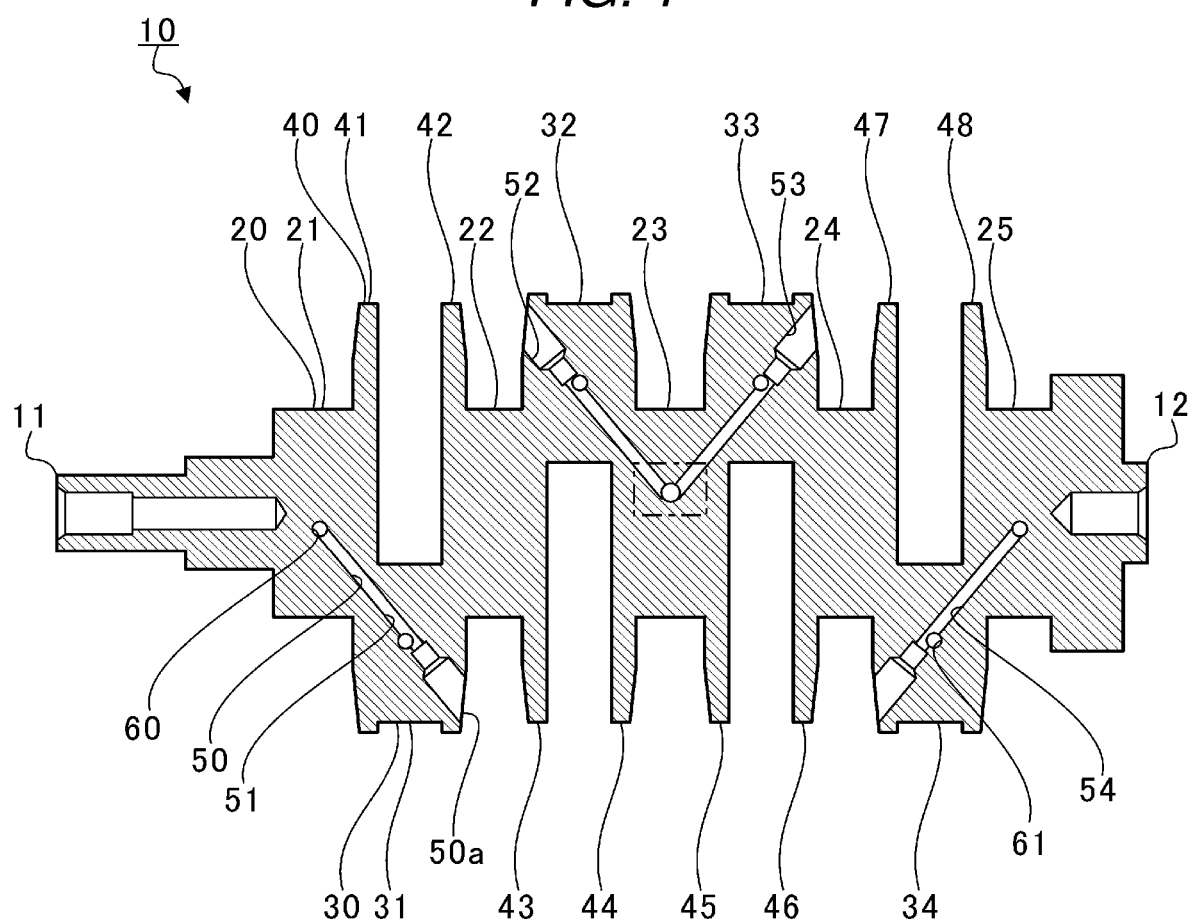
FIG. 1 is a schematic cross-sectional view of a crankshaft according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

Instead of the structure in which two oil holes intersect with each other as described in JP-A No. 2011-208741, crankshafts may have a structure in which three oil holes intersect. In this case, in order to check whether burrs generated during processing of the oil hole remain in the intersection, an operator checks an inside of the two oil holes from openings of the two oil holes, which may increase workloads.

In view of the above circumstances, it is desirable to provide a crankshaft capable of reducing workloads in checking burrs.

FIG. 1 is a schematic cross-sectional view of a crankshaft 10. The crankshaft 10 is to be mounted, for example, on a horizontally-opposed engine. A crankshaft pulley (not illustrated) is to be provided on one end 11 side of the crankshaft 10 (on the left side in FIG. 1). A transmission (not illustrated) is to be provided on the other end 12 side of the crankshaft 10 (on the right side in FIG. 1). As illustrated in FIG. 1, the crankshaft 10 includes journals 20, crank pins 30 and counterweights 40.

The journal 20 has a substantially cylindrical shape. A central axis of the journal 20 is substantially coaxial with a rotation axis of the crankshaft 10. The journal 20 is pivotally supported by a bearing (not illustrated) provided in a crankcase. The journals 20 include journals 21 to 25 in this order from the one end 11 side of the crankshaft 10.

The crank pin 30 has a substantially cylindrical shape. A central axis of the crank pin 30 is eccentric with respect to the rotation axis of the crankshaft 10. The crank pin 30 is inserted into one end portion of a connecting rod (not illustrated). The crank pins 30 include crank pins 31 to 34 in this order from the one end 11 side of the crankshaft 10.

The crank pin 30 is disposed between each adjacent pair of journals 20. The crank pins 31 and 34 are disposed on an opposite side to the crank pins 32 and 33 across the rotation axis of the crankshaft 10.

Each counterweight 40 is provided on one side of the corresponding one of the journals 20 that is closer to the adjacent crank pin 30 than the other side, and protrudes oppositely to the adjacent crank pin 30. The counterweight 40 is a weight for balancing the crank pin 30 during rotation of the crankshaft 10. The counterweight 40 includes counterweights 41 to 48 in this order from the one end 11 side of the crankshaft 10.

In addition, multiple oil holes 50 are formed in the crankshaft 10. An end 50a of the oil hole 50 opens at an end of the crank pin 30 in a rotation axis direction of the crankshaft 10. It is noted that the end 50a of the oil hole 50 is closed by an unillustrated plug member (such as an iron ball and an iron plug). The other end of the oil hole 50 is located in the journal 20. The oil hole 50 is inclined with respect to the rotation axis of the crankshaft 10.

The oil holes 50 include oil holes 51 to 54 in this order from the one end 11 side of the crankshaft 10. The oil hole 51 extends from the crank pin 31 to the journal 21. The oil hole 52 extends from the crank pin 32 to the journal 23. In one embodiment, the oil hole 52 may serve as a "first oil hole". The oil hole 53 extends from the crank pin 33 to the journal 23. In one embodiment, the oil hole 53 may serve as a "second oil hole". The oil hole 54 extends from the crank pin 34 to the journal 25.

In addition, multiple through holes 60 and 61 are formed in the crankshaft 10. The through holes 60 and 61 are orthogonal to the oil hole 50. Alternatively, the through holes 60 and 61 may not be orthogonal to the oil hole 50, but intersect the oil hole 50 at acute angles or obtuse angles. The through hole 60 passes through the journal 20. The through hole 61 passes through the crank pin 30. That is, both ends of the through hole 60 open on outer peripheral surfaces of the journal 20. Both ends of the through hole 61 open on outer peripheral surfaces of the crank pin 30.

Apart of lubricating oil supplied from the bearing (not illustrated) is supplied to the journal 20. A part of the lubricating oil supplied to the journal 20 is supplied to the oil hole 50 through the through hole 60. A part of the lubricating oil flowing into the oil hole 50 is supplied to the crank pin 30 through the through hole 61. In this way, the journal 20 and the crank pin 30 are lubricated. Further, the part of the lubricating oil supplied to the crank pin 30 may be supplied to components of a piston via the connecting rod and may be used for cooling the components of the piston.

Figure 2:
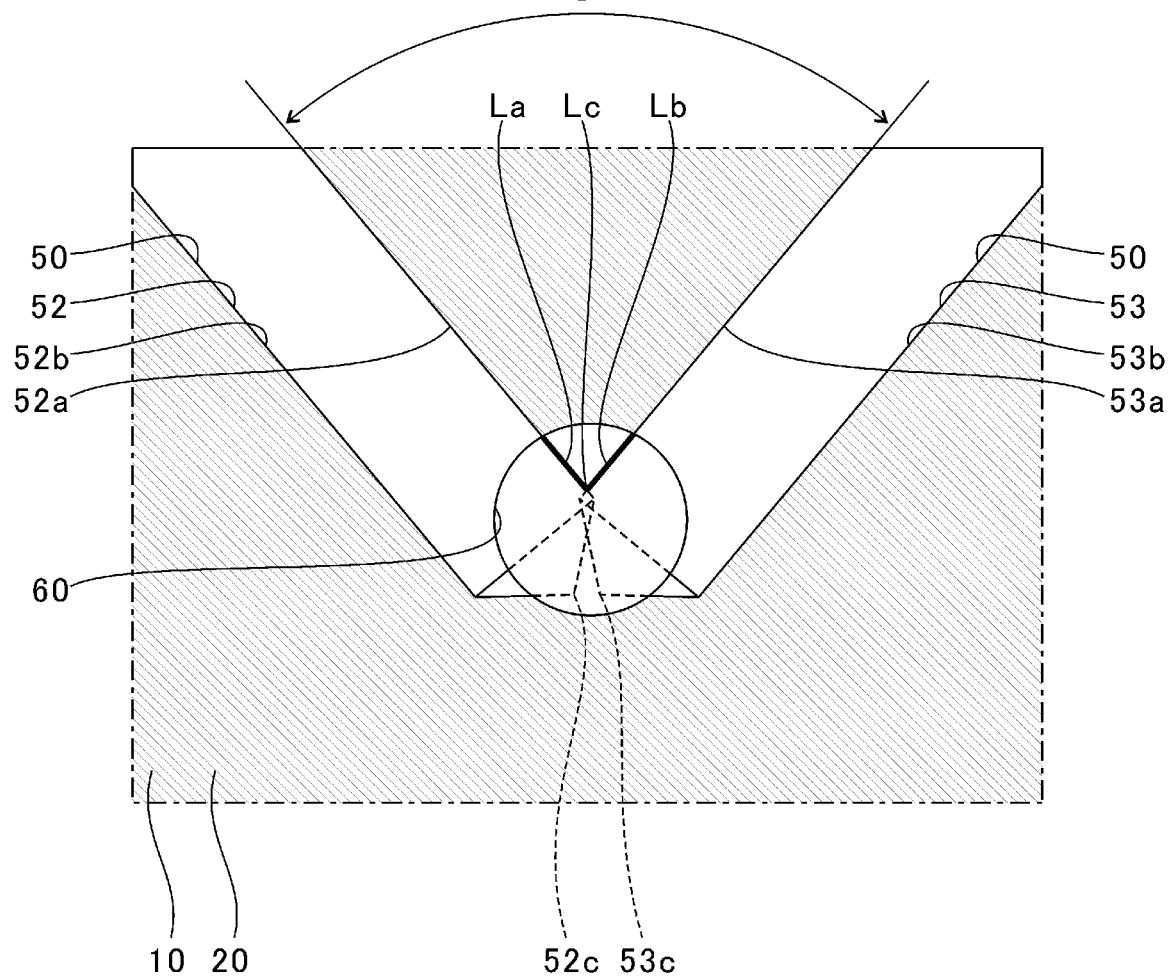
FIG. 2 is an enlarged view of a part of the crankshaft enclosed by a chain line in FIG. 1.

FIG. 2 is an enlarged view of a part of the crankshaft 10 enclosed by a chain line in FIG. 1. In FIG. 2, broken lines indicate parts of the contours of the oil holes 52 and 53 that have been removed by formation of the through hole 60. An inner wall surface 52a of the oil hole 52 is closer to the oil hole 53 than another inner wall surface 52b. An inner wall surface 53a of the oil hole 53 is closer to the oil hole 52 than another inner wall surface 53b. That is, the inner wall surfaces 52a and 53a are located on a side where an angle θ formed by the two oil holes 52 and 53 is less than 180 degrees (for example, on the upper side in FIG. 2).

A first extension La is an imaginary line extending from the inner wall surface 52a of the oil hole 52. A second extension Lb is an imaginary line extending from the inner wall surface 53a of the oil hole 53. In FIG. 2, the first extension La and the second extension Lb are drawn in thick lines. The first extension La and the second extension Lb intersect each other at an intersection Lc.

The through hole 60 passes through the intersection Lc. That is, the intersection Lc is located in the through hole 60. The intersection Lc is opposed to openings at both ends of the through hole 60 in directions in which the through hole 60 passes.

The through hole 60 passes through a tip 52c of the oil hole 52 in the part of the contours of the oil hole 52 that has been removed by the formation of the through hole 60. The through hole 60 passes through a tip 53c of the oil hole 53 in the part of the counters of the oil hole 53 that has been removed by the formation of the though hole 60. That is, the tips 52c and 53c are located in the through hole 60. The tips 52c and 53c are opposed to the openings at both ends of the through hole 60 in the directions in which the through hole 60 passes.

In this way, the oil hole 52 communicates with the oil hole 53 only via the through hole 60. The oil hole 52 and the oil hole 53 are not directly coupled to each other without the through hole 60.

Figure 3:
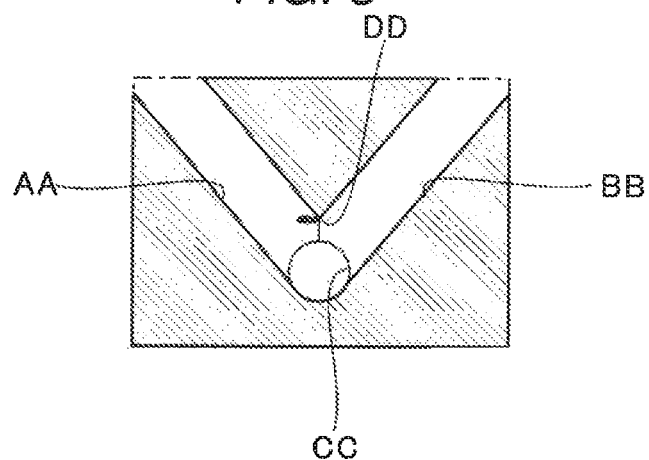
FIG. 3 is a diagram illustrating a comparative example.

FIG. 3 is a diagram illustrating a comparative example. For example, it is assumed that an oil hole AA is formed and then, an oil hole BB is formed. In the comparative example, a process of forming a through hole CC may push out burrs that have been generated during the process of forming the oil hole BB and remain in an intersection DD, toward the oil hole AA. In FIG. 3, the burrs are painted black. In order to check whether the burrs are generated, an operator checks the oil hole AA from an opening side of the oil hole AA. Also, the operator checks whether the pushed-out burrs remain in a through hole CC. That is, in the comparative example, the operator checks both the oil hole AA and the through hole CC from the openings thereof.

In contrast, in the crankshaft 10, the intersection Lc is located in the through hole 60 as illustrated in FIG. 2. The burrs (cross-hole burrs) which have been generated during the processes of forming the oil hole 52 and the oil hole 53 are pushed out to the through hole 60. Therefore, the operator may check whether the burrs remain simply from the openings of the through hole 60 without checking from the openings of the oil holes 52 and 53. As a result, workloads in checking the burrs can be reduced.

The embodiment of the disclosure has been described above with reference to the accompanying drawings. It is needless to say that the present disclosure is not limited to the embodiment. It will be apparent to those skilled in the art that various changes and modifications to the embodiment can be conceived within the scope of the appended claims, and it is to be understood that such changes and modifications also belong to the technical scope of the disclosure.

For example, in the embodiment described above, the through hole 60 passes through the tip 52c of the oil hole 52 and the tip 53c of the oil hole 53. In this case, cross-hole burrs located at lower positions than the intersection Lc in FIG. 2 are also pushed out to the through hole 60. Therefore, the operator can easily check whether the burrs remain, from the through hole 60.

In the embodiment described above, the other end of the through hole 60 also opens on the outer peripheral surface of the journal 20. In this case, the operator can easily check the through hole 60 by illuminating the through hole 60 from the opening at the other end. For example, accuracy of automatic determination by image diagnosis is improved. It is noted that the other end of the through hole 60 may be closed.

Further, in the embodiment described above, the outer peripheral surface on which the through hole 60 opens is of the journal 20 pivotally supported by the bearing. The oil holes 52 and 53 open at the ends of the crank pins 30 in the rotation axis direction. However, the through hole 60 and the oil holes 52 and 53 may be formed in other parts of the crankshaft 10.

In the embodiment described above, the crankshaft 10 is to be mounted on the horizontally-opposed engine. In this case, an interval between the adjacent crank pins 30 is narrow. It is difficult to check the insides of the oil holes 52 and 53 from the openings. The configuration of the embodiment described above allows to eliminate the process of checking from the openings of the oil holes 52 and 53. The crankshaft 10 is not limited to one to be mounted on a horizontally-opposed engine. The crankshaft 10 may be mounted on another engine.

According to the disclosure, it is possible to reduce workloads in checking burrs.

The invention claimed is:

1. A crankshaft, comprising:
   a first oil hole;
   a second oil hole that extends in a direction in which the second oil hole intersects the first oil hole; and
   a through hole,
   wherein:
      a first extension represents an imaginary line extending from an inner wall surface of the first oil hole on a second oil hole side;
      a second extension represents an imaginary line extending from an inner wall surface of the second oil hole on a first oil hole side;
      in a direction that the through hole extends from an outer peripheral surface of the crankshaft to the first oil hole and the second oil hole, the through hole passes through an intersection between the first extension and the second extension;

at least one end of the through hole opens on the outer peripheral surface of the crankshaft; and as viewed from the direction that the through hole extends from the outer peripheral surface of the crankshaft to the first oil hole and the second oil hole, the through hole extends to an area of the crankshaft that is located outside of the first oil hole and the second oil hole, wherein the through hole passes through a tip of the first oil hole and a tip of the second oil hole.

2. The crankshaft according to claim 1, wherein the outer peripheral surface of the crankshaft on which the through hole opens includes a journal, and wherein the first oil hole and the second oil hole open at ends of a crank pin in a rotation axis direction.

3. The crankshaft according to claim 1, wherein the tip of the first oil hole and the tip of the second oil hole are located adjacent to the intersection between the first extension and the second extension.

4. The crankshaft according to claim 1, wherein another end of the through hole opens on the outer peripheral surface of the crankshaft.

5. The crankshaft according to claim 4, wherein the outer peripheral surface of the crankshaft on which the through hole opens includes a journal, and wherein the first oil hole and the second oil hole open at ends of a crank pin in a rotation axis direction.

6. A crankshaft comprising:

a first oil hole;

a second oil hole intersecting the first oil hole; and a through hole extending in a predetermined direction from an outer peripheral surface of the crankshaft to the first oil hole and the second oil hole, wherein, in the predetermined direction, the through hole passes through an intersection between adjacent inner wall surfaces of the first oil hole and the second oil hole, wherein at least one end of the through hole opens on the outer peripheral surface of the crankshaft, wherein, as viewed from the predetermined direction, the through hole extends to an area of the crankshaft that is located outside of the first oil hole and the second oil hole, and wherein the through hole passes through a tip of the first oil hole and a tip of the second oil hole.

7. The crankshaft according to claim 6, wherein the tip of the first oil hole and the tip of the second oil hole are located adjacent to the intersection between the adjacent inner wall surfaces of the first oil hole and the second oil hole.

* * * * *